US006911117B1

(12) United States Patent
Karhunen et al.

(10) Patent No.: US 6,911,117 B1
(45) Date of Patent: Jun. 28, 2005

(54) METHOD AND EQUIPMENT FOR ATTENUATION OF OSCILLATION IN A PAPER MACHINE OR IN A PAPER FINISHING DEVICE

(75) Inventors: Jouko Karhunen, Jyväskylä (FI); Arto Puranen, Jyväskylä (FI); Jorma Köliö, Jyväskylä (FI); Esa Lehtovirta, Jyväskylä (FI); Erkki Hietamäki, Laukaa (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 09/403,912

(22) PCT Filed: Apr. 22, 1998

(86) PCT No.: PCT/FI98/00355

§ 371 (c)(1),
(2), (4) Date: Oct. 28, 1999

(87) PCT Pub. No.: WO98/49394

PCT Pub. Date: Nov. 5, 1998

(30) Foreign Application Priority Data

Apr. 30, 1997 (FI) ...................................... 971864

(51) Int. Cl.[7] ........................... D21G 7/00; F16F 15/00
(52) U.S. Cl. ..................... 162/199; 162/198; 162/263; 162/272; 248/562; 248/569; 248/636; 248/638; 267/136
(58) Field of Search ................................ 162/198–199, 162/263, 272, 338, 361, 278, 252; 248/562, 248/569, 559, 636, 638; 267/136–137

(56) References Cited

U.S. PATENT DOCUMENTS

| | | | |
|---|---|---|---|
| 3,902,677 A | * 9/1975 | Wolf | 242/66 |
| 3,917,246 A | 11/1975 | Gartner et al. | 267/136 |
| 4,267,496 A | * 5/1981 | Ivanov et al. | 318/615 |
| 4,395,904 A | 8/1983 | Ivanov et al. | 73/118.1 |
| 4,420,371 A | 12/1983 | Dahl et al. | 162/272 |
| 4,735,687 A | * 4/1988 | Pfalzer et al. | 162/254 |
| 4,910,842 A | 3/1990 | Brendel | 29/110 |
| 5,081,759 A | * 1/1992 | Schiel | 492/20 |
| 5,096,541 A | 3/1992 | Arnhold et al. | 162/199 |
| 5,184,703 A | 2/1993 | Van Zeggeren | 188/319 |
| 5,556,053 A | * 9/1996 | Hensler | 242/541.6 |
| 5,761,184 A | * 6/1998 | Dauber et al. | 369/247 |

(Continued)

FOREIGN PATENT DOCUMENTS

DE  4324595  12/1994  ............. D21F 1/18

(Continued)

*Primary Examiner*—José A. Fortuna
*Assistant Examiner*—B. Mizaki
(74) *Attorney, Agent, or Firm*—Steinberg & Raskin, P.C.

(57) ABSTRACT

A method and apparatus for damping vibration in a paper machine. The apparatus having a dynamic damper which includes a weight suspended by a spring. The spring constant of the spring is changed by means of a control device in order to tune the natural frequency of the dynamic damper. The dynamic damper is tuned to a frequency that is substantially equal to a multiple of the rotational frequency of the roll in the paper machine that is being damped.

26 Claims, 5 Drawing Sheets

U.S. PATENT DOCUMENTS

| | | | | |
|---|---|---|---|---|
| 5,938,144 A | * | 8/1999 | Kaipf et al. | 242/530.4 |
| 6,156,158 A | * | 12/2000 | Kustermann | 162/198 |
| 6,309,333 B2 | * | 10/2001 | Kirchner | 492/16 |
| 6,361,483 B1 | * | 3/2002 | Kirchner | 492/16 |
| 6,419,794 B2 | * | 7/2002 | Kustermann | 162/252 |
| 2001/0000065 | * | 3/2001 | Kustermann | 162/252 |

FOREIGN PATENT DOCUMENTS

| | | | | |
|---|---|---|---|---|
| DE | 10006193 A1 | * | 9/2000 | F16F 15/027 |
| EP | 0365800 A1 | * | 5/1990 | D21G 1/00 |
| EP | 0819638 | | 1/1998 | B65H 18/26 |
| WO | WO 9849394 A1 | * | 11/1998 | D21G 7/00 |

* cited by examiner

METHOD AND EQUIPMENT FOR ATTENUATION OF OSCILLATION IN A PAPER MACHINE OR IN A PAPER FINISHING DEVICE

FIELD OF THE INVENTION

The invention relates to a method and an apparatus for damping vibration in a paper machine or in a paper finishing device by means of a dynamic damper which comprises an additional weight suspended from a vibrating system by means of a spring.

BACKGROUND OF THE INVENTION

In paper machines and in paper finishing devices, vibrations constitute a major problem and, in present-day systems, when attempts are being made to achieve ever higher speeds, the vibration problems have become still more apparent than before. There are several possible sources of vibration in paper machines, and some of the most significant of them are rolls and cylinders, which comprise a very great mass revolving at a considerable speed. It is clear, of course, that when rolls are manufactured, attempts are being made to make their measurement precision as good as possible and, in addition, they are balanced in order to eliminate the vibrations.

However, present-day paper machines and paper finishing devices increasingly employ rolls provided with a soft coating, which rolls in operation may form a very significant source of vibration. Such rolls are used, for example, in on-line and off-line calenders, coating machines, size presses, supercalenders and equivalent, where said roll provided with a soft coating forms a nip with another roll. A paper web and possibly a felt, wire or equivalent is passed through the nip. When in this kind of nip roll arrangement, the seam of the wire, felt or web, considerable impurities or something else causing a noticeable change in the thickness of the web travelling through the nip, passes/pass through the nip during running, the coating must yield elastically, with the result that the coating serves as a spring that excites vibration. For example, in a size press and in a coating device of the size press type, the nip is defined by means of two rolls such that one nip roll is mounted by means of bearing housings directly on the frame structure of said device, while the opposite roll is mounted at its hearing housings on loading arms that are attached by means of articulated joints to the frame structure of the machine. In that case, the roll mounted on the loading arms in particular begins to vibrate, in which connection the coating of the soft-faced roll is deformed, with the result that the vibration increases and the roll begins to resonate. Until now, it has been necessary to take care of and to eliminate such vibrations so that, by changing the running speed of the machine, such a running speed has been sought that, at said running speed, the vibration does not grow any stronger but begins to be attenuated. The vibration problems have prevented the use of certain speeds.

OBJECT AND SUMMARY OF THE INVENTION

An object of the present invention is to provide a novel method and apparatus for damping vibrations that are being created such that the vibration can be damped by means of said method and apparatus without changing the running speed. The invention is based on the use of a dynamic damper, and the method in accordance with the invention is mainly characterized in that, in the method, the spring constant of a spring of the dynamic damper and/or the mass of the dynamic damper is/are changed by means of a control device in order to tune the natural frequency of the dynamic damper.

The apparatus in accordance with the invention is, in turn, characterized in that the apparatus comprises a control device which is arranged to change the spring constant of a spring of a dynamic damper and/or the mass of the dynamic damper in order to tune the natural frequency of the dynamic damper.

In an advantageous application of the invention, the vibration induced by rolls that are in nip contact is damped by means of the dynamic damper such that the damper is tuned to a frequency that is substantially equal to a multiple of the rotational frequency of the roll that is closest to the natural frequency of the vibrating system. The dynamic damper can also be tuned substantially directly to a frequency that corresponds to the problematic excitation frequency of a vibrating system.

In one advantageous embodiment of the invention, in the method, the vibration frequencies of a vibrating system are measured constantly by means of one or more vibration detectors, the measurement signals given by the vibration detector are amplified by means of an amplifier and fed into a vibration analyser which identifies the problematic excitation frequency and converts said problematic excitation frequency into a control signal which is fed into a control device in order to tune the dynamic damper.

In one application of the invention, the spring of the dynamic damper is a rod fixed at one end thereof to a vibrating system, such as, for example, a bearing housing of a roll, in a substantially horizontal direction, on support of which rod an additional weight is mounted. In that case, the control device may be arranged to change the spring constant of the spring of the dynamic damper by changing the position of the additional weight on said rod.

Preferably, a locking means is fitted on the rod serving as the spring of the damper in order to lock the additional weight in place after the tuning frequency of the damper has been made as desired. The rod and the additional weight disposed on the rod may be provided with threads fitting each other so that the position of the additional weight on the rod may be adjusted by rotating said additional weight on the rod. In this kind of arrangement, the locking means is arranged to act in the axial direction of the rod and to produce an axial force acting on the additional weight in order to provide a frictional force necessary for locking between the matching threads on the rod and on the additional weight.

The locking means is preferably a pneumatically operated piston device which is fixed on the rod and which is telescopic in order to provide the necessary stroke length.

In one embodiment of the invention, the additional weight included in the dynamic damper comprises a container suspended from the spring and filled with a liquid, the amount of the liquid in said container being adjustable in order to regulate the mass. In that connection, the control device is connected, for example, to a pump and a valve in order to regulate the amount of the liquid.

In one embodiment of the invention, the rod serving as the spring of the dynamic damper is made of memory metal. In this case, the natural frequency of the damper is arranged to be tuned by regulating the temperature of the rod made of a memory metal material by means of electric resistors or equivalent heaters. In this kind of embodiment of the invention, the additional weight can be attached to the rod rigidly and without a clearance, thereby providing a simpler construction in this respect.

The invention provides a significant advantage over prior art especially in that vibration is damped by means of the method and the apparatus in accordance with the invention without changing the running speed of the machine. A substantial and significant advantage is also that the apparatus is very simple in its construction and in its mode of implementation and that it can be connected by very simple operations to existing structures for the purpose of damping vibrations. The further advantages and characteristic features of the invention will become apparent from the following detailed description of the invention.

BRIEF DESCRIPTION OF THE DRAWINGS

In the following, the invention will be described by way of example with reference to the figures in the accompanying drawing.

DETAILED DESCRIPTION OF THE INVENTION

Figure 1:
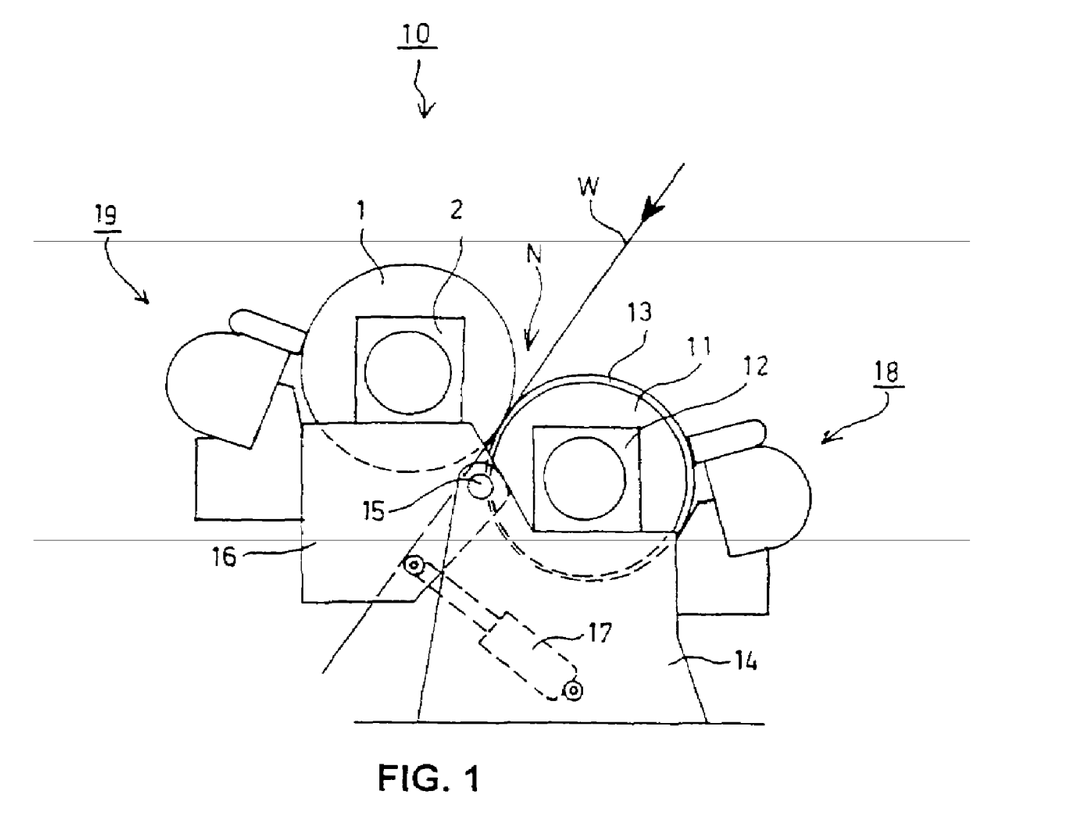
FIG. 1 schematically depicts a size press or a coating machine of the size press type to which the apparatus in accordance with the invention can be applied.

FIG. 1 has been included merely to illustrate one possible application of the invention and, thus, FIG. 1 shows a size press or equivalent, which is generally denoted with the reference numeral 10. The size press 10 comprises a frame 14 on which a first size press roll 11 has been mounted directly by means of bearing housings 12. In the illustration of FIG. 1, said roll 11 is provided with a soft roll coating 13. Loading arms 16 have been mounted pivotally on the frame 14 of the size press by means of a pivot shaft 15 extending in the cross direction of the machine, on support of which loading arms a second roll 1 defining a nip N with the first roll 11 has been mounted at its bearing housings 2. For the purpose of providing a desired linear load in the nip N, the loading arms 16 are loaded by means of hydraulic cylinders 17, by whose means the nip N may also be opened. The reference signs 18 and 19 designate coating units by whose means a coating material, such as size, pigment coating material or equivalent is applied to the surface of the rolls. In a normal way, a web W is passed through the nip N.

When a seam or some other equivalent thicker part travels through the nip N in the size press shown in FIG. 1, the soft roll coating 13 is deformed and it functions as a spring, with the result that the apparatus, in particular the roll 1 pivotally mounted on the frame 14, begins to vibrate. Vibration deforms the soft roll coating 13 further, whereupon the vibration is intensified and the roll 1 is brought to a resonating state. In conventional arrangements, this has led to the fact that it has been necessary to change the running speed because it has not been possible to dampen the vibration otherwise. In the invention, however, the damping of vibration has been taken care of such that a dynamic damper that is automatically tuned in accordance with the invention is mounted on the bearing housing 2 of the vibrating roll 1, which damper is illustrated in more detail in FIG. 2 of the drawing.

Figure 2:
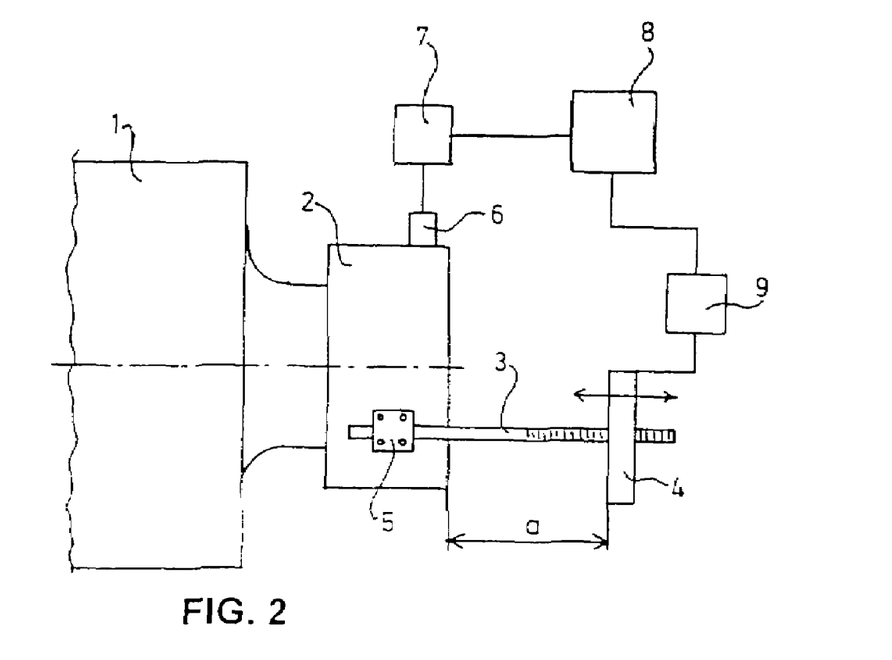
FIG. 2 shows in schematic form one example of the apparatus in accordance with the invention.

As shown in FIG. 2, the apparatus in accordance with the invention is in its principle very simple. In principle, the invention is constituted by a dynamic damper known per se and fitted on a vibrating system, i.e. in this case on the bearing housing 2 of the roll 1, which damper comprises a mass 4 suspended from the vibrating system 2 by means of a spring 3. In the illustration of FIG. 2, the spring is a rod 3 rigidly fitted on the bearing housing 2 by means of attachment members 5, which rod is additionally provided with threads in the example of the figure. As the mass serves a weight 4 which is fitted on the rod 3 and which can be displaced by means of the threads in the longitudinal direction of the rod 3 such that the distance a of the weight 4 from the bearing housing 2 can be regulated. As already stated once above, the damper is thus a dynamic damper known per se. The basic equation of dimensioning the dynamic damper is simply:

$k/m = \Omega^2$ where k=the spring constant of the spring, i.e. the rod 3 in this case, m=the mass of the weight 4, and $\Omega$=the angular velocity of the vibrating system, i.e. the bearing housing 2.

The effect of the dynamic damper is based in one advantageous embodiment of the invention on the fact that the natural frequency of said damper is tuned so as to be equal to the problematic excitation frequency. In this connection, it shall be pointed out that there may be several problematic excitation frequencies that differ from one another, but in one example which employs a coating machine of the size press type like the one shown in FIG. 1 there was a so-called lower problem frequency, in which the motion of bearing housings was large, of the order of about 50 Hz. Since the effective damping capacity of the dynamic damper is, however, limited to a relatively narrow frequency band, it is clear that it must be possible to regulate the natural frequency of the damper. As it is commonly known that, for example, in the case shown in FIG. 2, the spring constant k of the rod 3 is inversely proportional to the power of three of the length of the rod, it is easy to regulate the natural frequency of the damper by adjusting the distance a of the weight 4 from the bearing housing 2. When the natural frequency of the damper has been made equal to the problematic excitation frequency by changing the distance a, the bearing housing 2 ceases to vibrate and the weight 4 resting on support of the rod 3 begins to vibrate, respectively. This means that the arrangement formed by means of an additional spring, i.e. the rod 3, and an additional weight. i.e. the weight 4, produces a force that is in an opposite phase and of equal magnitude to the excitation, whereby the vibration of the machine itself ceases.

As already stated above, a vibrating system or an equivalent object may have several problematic excitation frequencies because, depending on the system, it may include several devices which vibrate at different frequencies. For example, in the size press arrangement described previously, a significant source of vibration in the system is a vibrating roll. In this kind of example, the natural frequency of the vibrating system is not necessarily equal to a multiple of the rotational frequency of the roll inducing the vibration (in most instances this is not the case). In that connection, a very effective way of damping the vibrations of the system is that the damper, for example, a damper of the kind illustrated in FIG. 2, is tuned to a frequency which corresponds to a multiple of the rotational frequency of the roll that is closest to the natural frequency of the vibrating system. This multiple of the rotational frequency is thus used as the tuning frequency of the damper. This is illustrated fully schematically in FIG. 3, which shows the relation between the natural frequency of a vibrating system and multiples of the rotational frequency of a roll in a frequency/amplitude coordinate system.

If the device in question were a device that is operated continuously at a constant speed, the vibrations could be brought under control merely by tuning the natural frequency of the dynamic damper once to a correct level. However, in the paper machine application, the running speeds and thus the vibration frequencies too vary. Consequently, it must be possible to regulate the dynamic damper fairly precisely. In the inventive arrangement shown in FIG. 2, adjustability is provided such that the hearing housing 2 whose vibration is desired to be damped is provided with a vibration detector 6. The vibration detector 6 transmits a signal that is amplified by an amplifier 7 and passed further to a computer 8 serving as a vibration analyser, which filters and analyses the vibration frequencies and locates the problematic excitation frequency among the frequencies and converts it into a control signal and transmits said control signal to a control device 9 which moves the weight 4 on the rod 3. The control device 9 is advantageously, for example, a stepping motor. The apparatus thus comprises a closed control circuit that constantly measures and analyses vibrations and, based on this, regulates the natural frequency of the dynamic damper.

Figure 3:
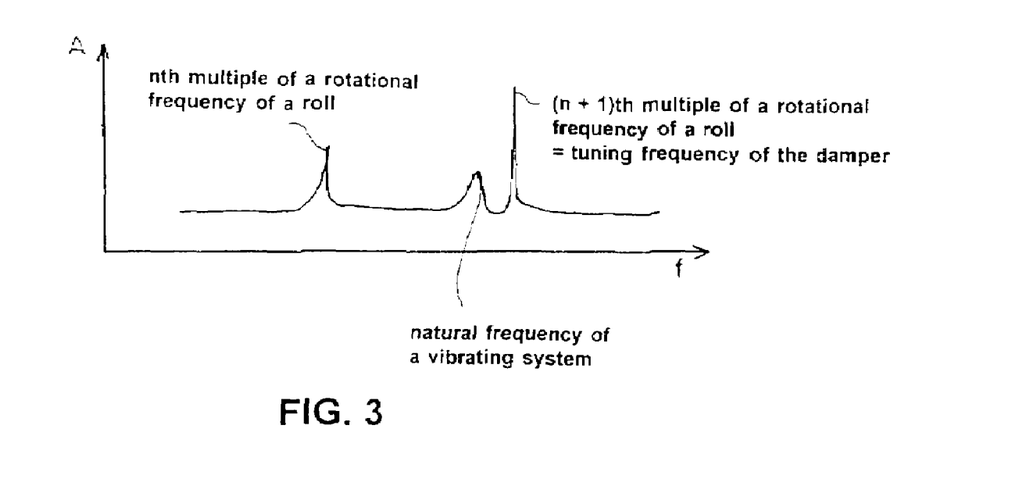
FIG. 3 is a graph showing an advantageous mode of tuning a damper.
Figure 4:
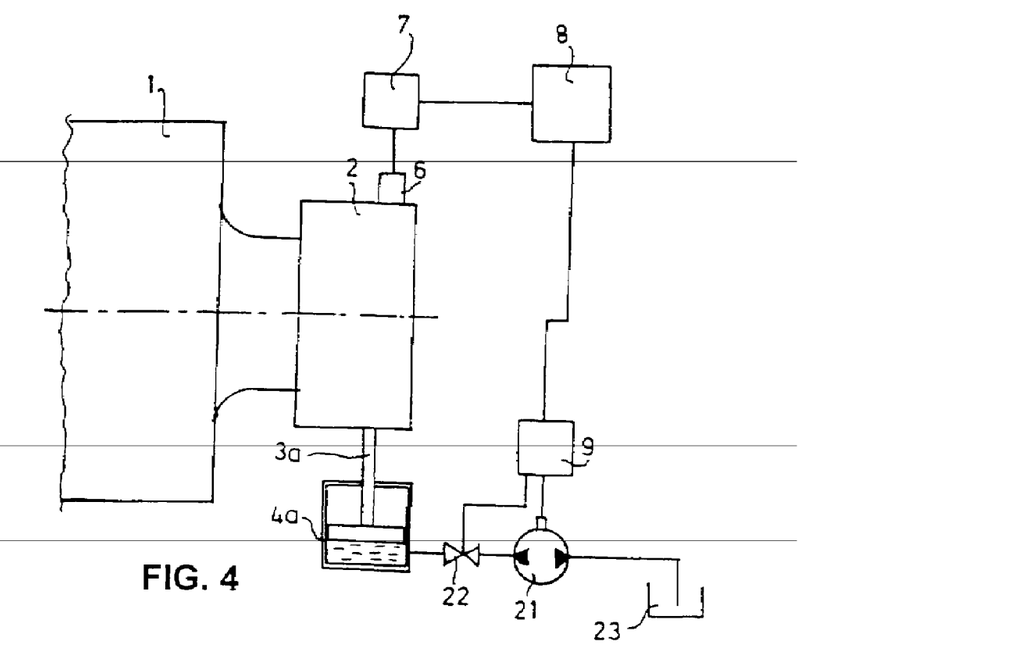
FIG. 4 is an illustration corresponding to that of FIG. 2 of another example of the apparatus in accordance with the invention.

The illustration of FIG. 4 corresponds to that of FIG. 2 so that this example also uses a vibration detector 6 that measures and identifies the vibrations of a bearing housing 2 and transmits in accordance therewith a signal that is amplified by an amplifier 7 and passed further to a vibration analyser 8. The vibration analyser 8 converts the problematic excitation frequency it has found from the vibration frequencies analysed by it into a control signal and transmits it to a control device 9. The dynamic damper differs in this example from the one described previously such that the damper comprises a spring 3a which is suspended from the bearing housing 2 and from which a weight 4a is suspended whose mass can be changed. The spring 3a itself is here constant in length. The weight 4a comprises, for example, as shown in FIG. 3, a container and a liquid in said container, the amount of said liquid being regulated by means of a pump 21 and a valve 22. The container is denoted with the reference sign 23. The control device 9 thus controls said pump 21 and valve 22 based on the control signal received by it in order to change the amount of the liquid in the container of the weight 4a.

Figure 5:
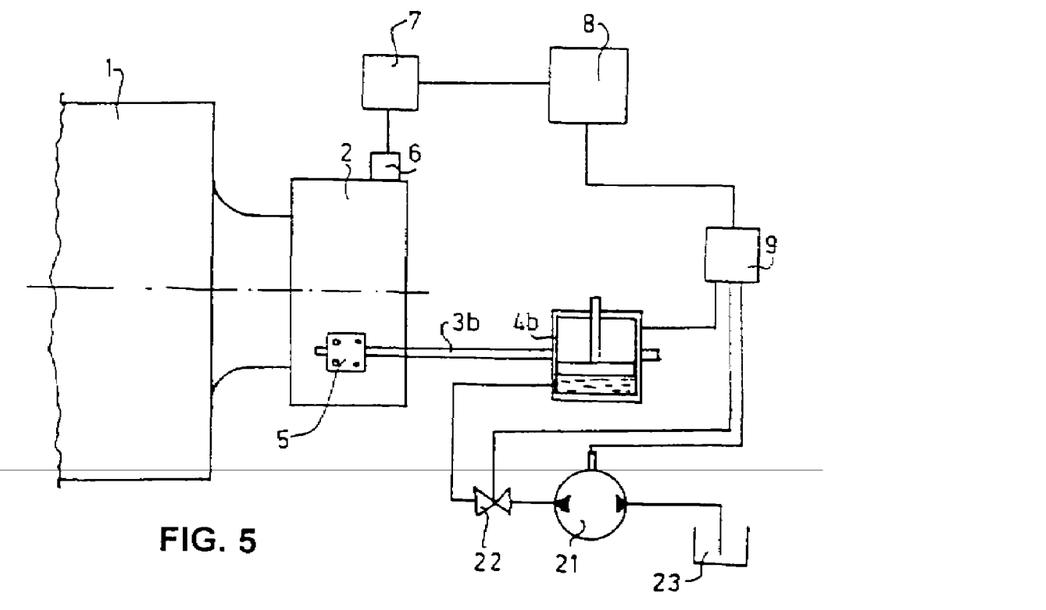
FIG. 5 shows a further example of the apparatus in accordance with the present invention.

FIG. 5 shows a further embodiment of the invention which differs from the ones described previously. In this embodiment, the spring 3b of the dynamic damper comprises a rod that is mounted and attached to a bearing housing 2 in a way corresponding to the illustration of FIG. 2. The weight 4b of the damper in turn corresponds in structure and in operation to the illustration of FIG. 3 so that it comprises a container and a liquid therein whose amount is regulated by means of a pump 21 and a valve 22. In the illustration of FIG. 5, the weight 4b is, however, suspended from the spring 3b such that its distance a from the bearing housing 2 can be changed, for example, in a way corresponding to that shown in FIG. 2. Accordingly, both the distance a of the weight 4b from the bearing housing 2 and the mass of the weight 4b are regulated in the illustration of FIG. 5.

Figure 6:
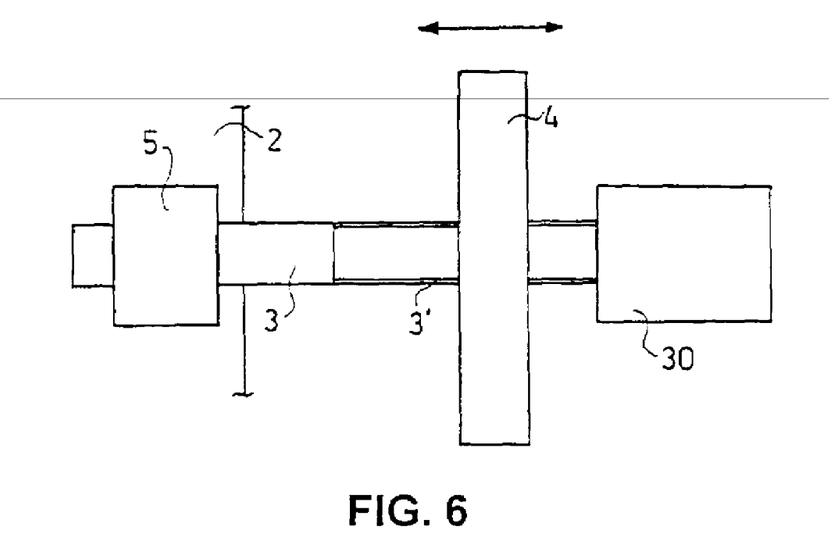
FIG. 6 shows an embodiment of the invention in which a special locking means is used for an additional weight of a damper.
Figure 7A:
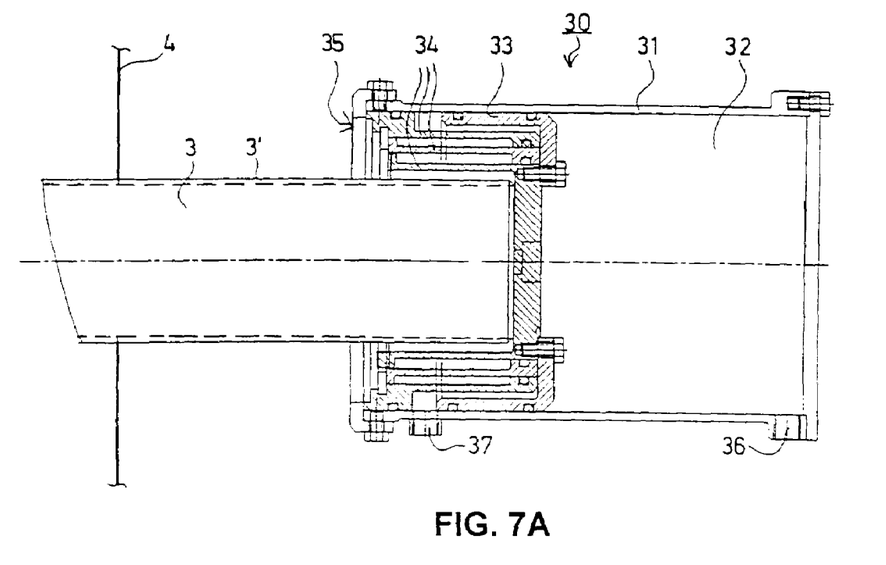
FIGS. 7A and 7B are more detailed sectional views of the locking means shown in FIG. 6.
Figure 7B:
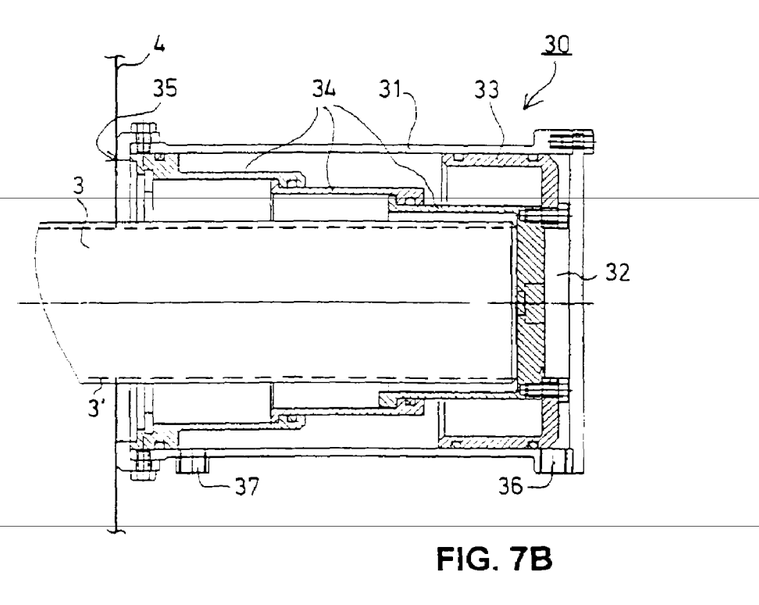

FIG. 6 shows an embodiment of the apparatus in accordance with the invention which is provided with a locking means 30 by whose means an additional weight 4 can be locked in place on the rod 3. In accordance with the embodiments described above, the rod 3 serving as the spring of the dynamic damper is attached to a vibrating system 2, such as, for example, a bearing housing by means of suitable attachment members 5. FIG. 6 further shows that the rod 3 is provided with threads 3' and, in a similar way, the additional weight is provided with threads matching said threads 3' so that said additional weight may be moved on the rod 3 by rotating. i.e. by "screwing". Once the additional weight 4 has been brought to a correct place on the rod 3, it is locked in place by means of the locking means 30, which produces a force in the axial direction of the rod 3 in order to provide a frictional force necessary for locking between the rod 3 and the additional weight 4. As shown in FIG. 6, the locking means 30 is preferably attached to a free outer end of the rod 3. In FIG. 6, the locking means 30 is shown in a free position, in which connection the additional weight 4 can be moved by rotating on the rod 3. The structure and operation of the locking means 30 is illustrated in more detail in schematic sectional views 7A and 7B.

FIGS. 7A and 7B thus show the structure of the locking means 30 in more detail. FIG. 7A shows the locking means 30 in a free position corresponding to that of FIG. 6 and, correspondingly, in FIG. 7B, the locking means 30 is shown in a locking position. The locking means 30 comprises a cylindrical casing 31 which confines within it a cavity that serves as a pressure space 32. A piston 33 is disposed in this pressure space 32 and sealed by means of seals against the inner wall of the casing 31, said piston 33 being telescopic in the illustrated embodiment comprising telescopic parts 34. The piston 33 is attached to the rod 3, preferably in the fashion shown in FIGS. 7A and 7B to the outer end of the rod 3 immovably, and the cylindrical casing 31 of the locking means 30 is thus fitted axially movably on the piston 33 and on the rod 3. The piston 33 divides the pressure space 32 in the axial direction in two pans, which are both provided with a connecting member 36, 37 for feeding in a pressure medium. Compressed air is preferably used as the pressure medium. Depending on the side of the piston 33 into which the pressure medium is passed, the locking means is brought either to the free position shown in FIG. 7A or to the locking position shown in FIG. 7B. In the locking position, the casing 31 of the locking means 30 has been displaced so that the end face 35 of the casing facing the additional weight 4 lies against said additional weight. The additional weight 4 is shown in FIGS. 7A and 7B only partially and schematically. When the pressure medium is conducted through the connecting member 37 into the pressure space of the locking means 30, an axial force needed for locking is produced, which force provides a frictional force of required magnitude between the thread 3' on the rod 3 and the matching thread on the additional weight 4.

Figure 8:
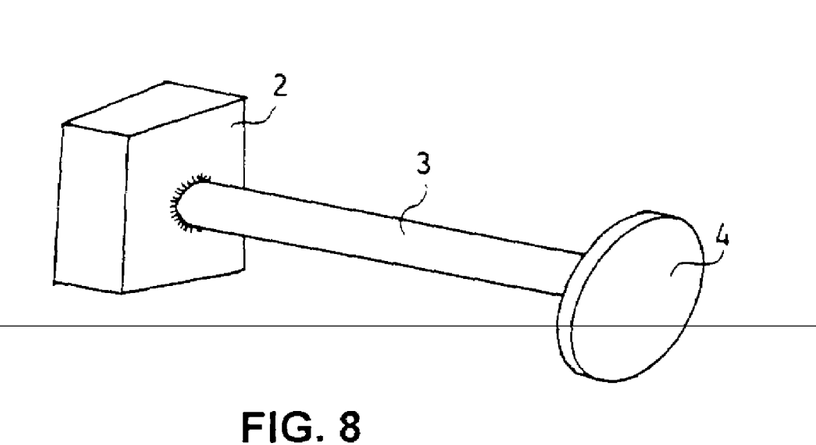
FIG. 8 is a schematic view of a damper in which a memory metal material is used in the spring of the damper.

Finally, FIG. 8 shows fully schematically an alternative of the invention where the spring of the dynamic damper, i.e. the rod 3, is made of memory metal. The coefficient of elasticity of memory metal is highly dependent on temperature. In that case, the natural frequency of the damper can be tuned to a right level by regulating the temperature of the rod 3. Regulation of temperature can be performed, for example, by means of electric resistors or equivalent heaters. In this kind of arrangement, an additional weight 4 can be attached to the rod 3 totally rigidly and without a clearance, for example, by welding. The structure may thus be made fairly simple. Regarding memory metals, it may be stated that there are alloys of different metals which are suitable, of which an alloy of nickel and titanium may be mentioned as one example.

The properties of such an alloy may be regulated by introducing into it a sufficient amount of energy in the form of heating, with the result that the crystal structure of the metal alloy can be changed by this introduction of additional energy. Memory metal "remembers" the change which a certain heating operation brings about in the metal alloy.

It is also conceivable that the dynamic damper is applied in connection with hollow tubular rolls, for example, such that the dynamic damper is disposed inside a roll tube. In this case, the dynamic damper might comprise two or more springs which are fixed to the inner surface of the roll tube while the weight of the dynamic damper is fixed on support of said springs. However, it may be considered that it is more difficult to provide adjustability for this kind of damper than in the examples described previously.

The invention has been described above in connection with a size press and a coating machine of the size press type in particular. However, problems of the similar type are also encountered, inter alia, in soft calenders and in supercalenders, and the apparatus in accordance with the invention may also be applied to them. The problematic excitation frequencies differ, however, in these applications both from one another and from the arrangement shown in FIG. 1.

Above, the invention has been described by way of example with reference to the figures in the accompanying drawing. The invention is, however, not confined to relating only to the examples illustrated in the figures, but different embodiments of the invention may vary within the scope of the inventive idea defined in the accompanying claims.

What is claimed is:

1. A method for damping vibration induced by a roll (1) in a paper machine or in a paper finishing device by means of a dynamic damper which comprises: a weight (4, 4a, 4b) and a spring (3, 3a, 3b), connecting the weight (4, 4a, 4b) to a vibrating system (2) of the paper machine or paper finishing device, whereby the dynamic damper is tuned by means of a control device (9) to a tuning frequency that is substantially equal to a multiple of the rotational frequency of the roll (1) that is closest to the natural frequency of the vibrating system (2), or to a tuning frequency that substantially corresponds to the problematic excitation frequency of the vibrating system (2), wherein said weight (4, 4a, 4b) is suspended from said vibrating system by means of said spring (3, 3a, 3b) and in that, the spring constant of the spring (3, 3b) of the dynamic damper and/or the mass of the weight (4a, 4b) of the dynamic damper is/are changed by means of the control device (9) in order to tune the natural frequency of the dynamic damper so as to be said tuning frequency.

2. A method as claimed in claim 1, wherein the vibration frequencies of the vibrating system (2) are measured constantly by means of one or more vibration detectors (6), the measurement signal given by the vibration detector (6) is amplified by means of an amplifier (7) and fed into a vibration analyser (8), which identifies the problematic excitation frequency and converts said problematic excitation frequency into a control signal, which is fed into a control device (9) in order to tune the dynamic damper.

3. A method as claimed in claim 1, wherein the spring of the dynamic damper is a rod (3) attached at one end thereof to the vibrating system (2), wherein the spring constant is changed by changing the position of the weight (4) on the rod (3).

4. A method as claimed in claim 3, wherein when the desired tuning frequency of the dynamic damper has been obtained, the weight is locked in place on the rod by means of a locking means.

5. A method as claimed in claim 4, wherein the locking means (30) is operated by means of compressed air.

6. A method as claimed in claim 1, wherein a rod (3) made of memory metal is used as the spring of the dynamic damper.

7. A method as claimed in claim 6, wherein the natural frequency of the damper is tuned by regulating the temperature of the rod (3) made of the memory metal material.

8. A method as claimed in claim 7, wherein the temperature of the rod (3) is regulated by means of heaters.

9. An apparatus for damping vibration induced by a roll (1) in a paper machine or in a paper finishing device, said apparatus having a dynamic damper which comprises a weight (4, 4a, 4b) and a spring (3, 3a, 3b) connecting the weight (4, 4a, 4b) to a vibrating system (2) of the paper machine or paper finishing device, said apparatus further comprising a control device which is arranged to tune the dynamic damper to a tuning frequency that is substantially equal to a multiple of the rotational frequency of the roll (1) that is closest to the natural frequency of the vibrating system, or to a frequency that substantially corresponds to the problematic excitation frequency of the vibrating system wherein said weight (4, 4a, 4b) is suspended from said vibrating system (2) by means of said spring (3, 3a, 3b) and in that said control device (9) is arranged to change the spring constant of the spring (3, 3b) of the dynamic damper and/or the mass of the weight (4a, 4b) of the dynamic damper in order to tune the natural frequency of the dynamic damper so as to be said tuning frequency.

10. An apparatus as claimed in claim 9, wherein the apparatus comprises one or more vibration detectors (6) which measure(s) the vibration frequencies of the vibrating system (2) constantly and which is/are arranged to transmit measurement signal, an amplifier (7) that amplifies the measurement signal, a vibration analyser (8) which is arranged to receive the measurement signal transmitted by the vibration detector (6) and amplified by the amplifier (7), to identify the problematic excitation frequency from said measurement signal and to convert said problematic excitation frequency into a control signal to be fed into the control device (9) in order to tune the dynamic damper.

11. An apparatus as claimed in claim 9, wherein the spring (3, 3b) of the dynamic damper is a rod fixed at one end thereof to the vibrating system (2) in a substantially horizontal direction, on support of which rod the weight (4, 4b) is mounted, and that the control device (9) is arranged to change the spring constant of the spring (3, 3b) of the dynamic damper by changing the position of the weight (4, 4b) on the rod (3, 3b).

12. An apparatus as claimed in claim 11, wherein a locking means is mounted on the rod serving as the spring of the damper in order to lock the weight in place when the desired tuning frequency of the damper has been obtained.

13. An apparatus as claimed in claim 12, wherein the locking means (30) is a piston device fixed onto the rod.

14. An apparatus as claimed in claim 13, wherein the piston device (30) is telescopic in order to provide the necessary stroke length.

15. An apparatus as claimed in claim 12, wherein the locking means (30) is operated by compressed air.

16. An apparatus as claimed in claim 11, wherein the rod (3) and the weight (4) fitted on the rod are provided with matching threads (3'), and that the position of the weight (4) on the rod (3) can be regulated by rotating said additional weight on the rod.

17. An apparatus as claimed in claim 16, wherein the locking means (30) is arranged to act in the axial direction of the rod (3) and to produce an axial force acting on the weight (4) in order to provide a frictional force necessary for locking between the matching threads on the rod (3) and on the weight (4).

18. An apparatus as claimed in claim 9, wherein the weight (4, 4b) included in the dynamic damper comprises a container suspended from the spring (3a, 3b) and filled with a liquid, the amount of the liquid in said container being adjustable in order to regulate the mass of the weight (4a, 4b).

19. An apparatus as claimed in claim 18, wherein the control device (9) is connected to a pump (21) and to a valve (22) in order to regulate the amount of the liquid.

20. An apparatus as claimed in claim 9, wherein the control device comprises a stepping motor in order to change the location of the weight (4, 4b) on the spring (3, 3b).

21. An apparatus as claimed in claim 9, wherein the apparatus is fitted so as to dampen vibration in a nip in which at least one of the rolls forming the nip is provided with a soft coating (9).

22. An apparatus as claimed in claim 9, wherein the dynamic damper and the vibration detector(s) (6) are fitted and fixed to a bearing housing (2) of the roll.

23. An apparatus as claimed in claim 9, wherein the spring of the dynamic damper is a rod (3) made of memory metal.

24. An apparatus as claimed in claim 23, wherein the natural frequency of the damper is arranged to be tuned by regulating the temperature of the rod made of the memory metal material.

25. An apparatus as claimed in claim 24, wherein, in order to regulate the temperature of the rod, the apparatus is provided with electric resistors.

26. An apparatus as claimed in claim 23, wherein the weight (4) is fixed to the rod (3) rigidly and without clearance.

* * * * *